US011436687B2

(12) United States Patent
Levin et al.

(10) Patent No.: US 11,436,687 B2
(45) Date of Patent: Sep. 6, 2022

(54) REAL-TIME MOBILITY POLICY ENGINE

(71) Applicant: Cubic Corporation, San Diego, CA (US)

(72) Inventors: Zachary Levin, San Diego, CA (US); Christiana Casto, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/938,506

(22) Filed: Jul. 24, 2020

(65) Prior Publication Data

US 2021/0027391 A1    Jan. 28, 2021

Related U.S. Application Data

(60) Provisional application No. 62/879,320, filed on Jul. 26, 2019.

(51) Int. Cl.
*G06Q 40/00* (2012.01)
*G06Q 30/00* (2012.01)
*G06Q 50/26* (2012.01)
*G08G 1/01* (2006.01)

(52) U.S. Cl.
CPC .......... *G06Q 40/10* (2013.01); *G06Q 30/018* (2013.01); *G06Q 40/123* (2013.12); *G06Q 50/26* (2013.01); *G08G 1/0104* (2013.01)

(58) Field of Classification Search
CPC .... G06Q 40/10; G06Q 40/123; G06Q 30/018; G06Q 50/26
See application file for complete search history.

(56) References Cited

U.S. PATENT DOCUMENTS

| 5,428,542 A * | 6/1995 | Liesveld | G01C 22/02 340/990 |
| 6,115,655 A * | 9/2000 | Keith | G01C 21/26 701/33.4 |
| 7,756,617 B1 * | 7/2010 | Cluff | G07C 5/0858 701/33.4 |

(Continued)

FOREIGN PATENT DOCUMENTS

LU          100674 B1      7/2019

OTHER PUBLICATIONS

International Search Report and Written Opinion dated Oct. 8, 2020 in related application No. PCT/US2020/043522, all pgs.

(Continued)

*Primary Examiner* — Florian M Zeender
*Assistant Examiner* — Christopher R Buchanan
(74) *Attorney, Agent, or Firm* — Kilpatrick Townsend & Stockton LLP

(57) ABSTRACT

A method of determining real-time tax and/or subsidy information includes obtaining, from an operator, trip-related information regarding a trip and determining a target objective associated with trip routing at a time of receipt of the trip-related information. The method includes obtaining additional information from one or more additional data sources based on the target objective and the trip-related information, determining, based on the trip-related information and the additional information, a tax or subsidy associated with the trip, and providing information indicative of the tax or subsidy to the operator.

20 Claims, 6 Drawing Sheets

(56) References Cited

U.S. PATENT DOCUMENTS

| | | | | |
|---|---|---|---|---|
| 7,908,191 B1* | 3/2011 | Dinamani | ............... | G06Q 40/02 |
| | | | | 705/31 |
| 10,552,879 B1* | 2/2020 | Hardiman | .......... | G06Q 30/0278 |
| 2012/0150704 A1* | 6/2012 | Acklam | ............... | G06Q 40/123 |
| | | | | 705/31 |
| 2015/0178737 A1* | 6/2015 | Simpson | ................ | G07C 5/008 |
| | | | | 705/317 |
| 2016/0110820 A1* | 4/2016 | Fleck | ...................... | H04W 4/44 |
| | | | | 705/36 T |
| 2017/0099582 A1* | 4/2017 | Boesen | ................ | H04W 4/029 |
| 2017/0236342 A1* | 8/2017 | Mattsson | ............. | G07C 5/0841 |
| | | | | 701/32.5 |
| 2018/0315130 A1* | 11/2018 | Kamat | ................... | G06Q 40/02 |
| 2020/0202453 A1* | 6/2020 | Sworski | ................ | G06Q 50/06 |

OTHER PUBLICATIONS

Anonymous: "Modular programming—19,20 Wikipedia", May 31, 2016 (May 31, 2016), XP055632027, Retrieved from the Internet: URL:https://en.wikipedia.org/w/index.php?title=Modular_programming&oldid=F723013178 [retrieved on Oct. 15, 2019], entire document.
International Preliminary Report on Patentability dated Feb. 10, 2022 in International Patent Application No. PCT/US2020/043522, 7 pages.

* cited by examiner

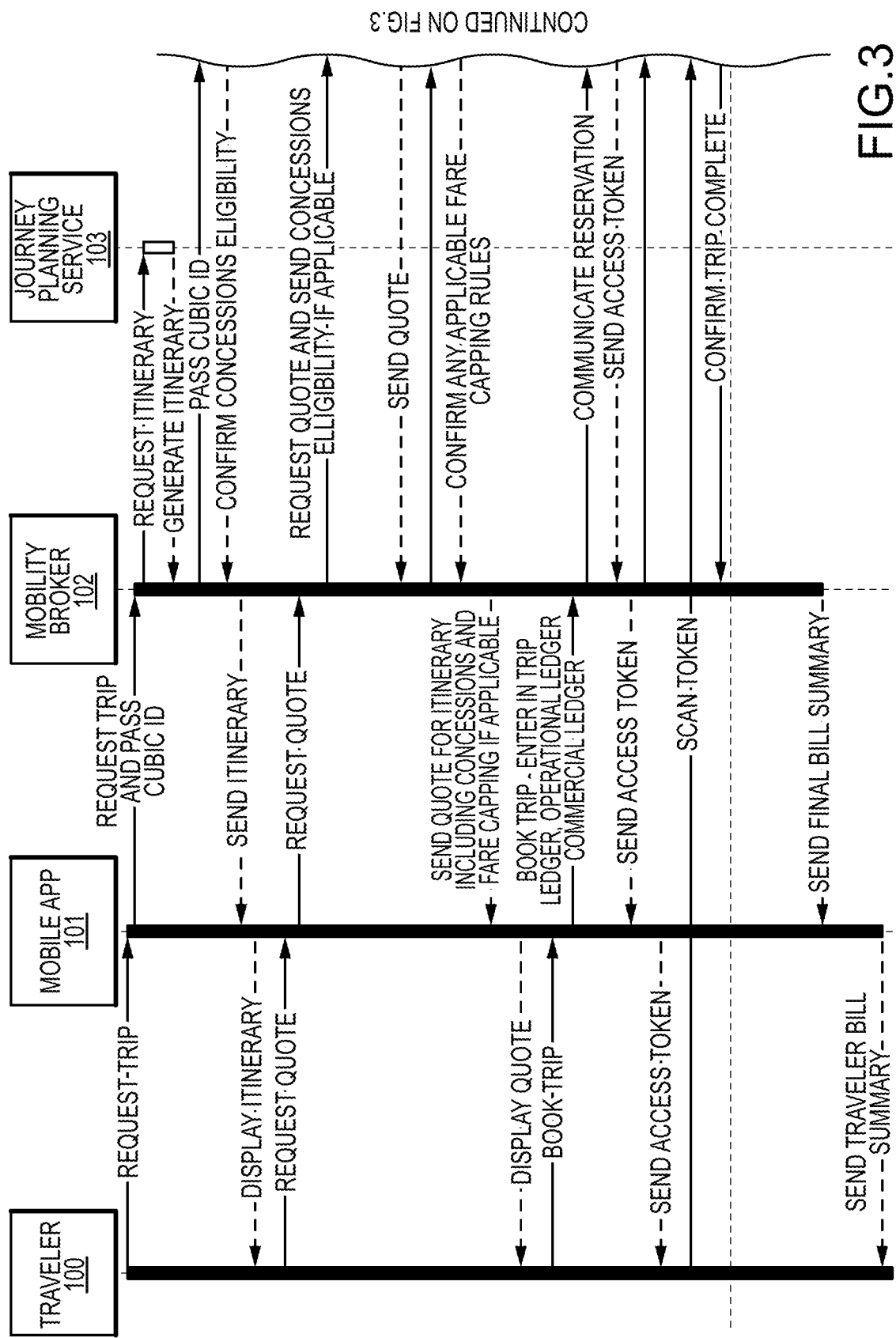

REAL-TIME MOBILITY POLICY ENGINE

CROSS-REFERENCES TO RELATED APPLICATIONS

This Application claims priority to U.S. Provisional Patent Application No. 62/879,320, filed Jul. 26, 2019, entitled "REAL-TIME MOBILITY POLICY ENGINE," the entire disclosure of which is hereby incorporated by reference, for all purposes, as if fully set forth herein.

BACKGROUND OF THE INVENTION

Governments (on a federal, state, and local level) often deal with transportation-related issues, such as congestion, pollution, etc., by incentivizing or discouraging behavior regarding modes of transportation through the use of taxes and subsidies. For example, mass transit will often be subsidized to encourage travelers to utilize mass transit, while gas taxes and road tolls can be used to discourage travelers from using personal cars on public roads. While governments may be able to adjust taxes and subsidies on a scheduled basis (e.g., increasing taxes and/or subsidies during rush hours on weekdays), governments are typically unable to implement policy objectives when responding to transportation-related issues in real time. Improvements in this area are desired.

BRIEF SUMMARY OF THE INVENTION

Embodiments of the present invention are directed to systems and methods for providing incentive (such as travel subsidies) and/or tax values that are dynamically calculated to reflect real-time or near real-time conditions to best achieve the objectives of a transit authority and/or government entity. For example, current levels of pollution, congestion, traffic data, population density, and/or other factors may be monitored, allowing the tax or subsidy to be dynamically adjusted to account for current conditions such that the government (or other authority) to more efficiently achieve target policy objectives. Embodiments may also implement fare capping and/or concession programs that may cap taxes and/or otherwise incentivize certain forms of transportation based on the current conditions.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
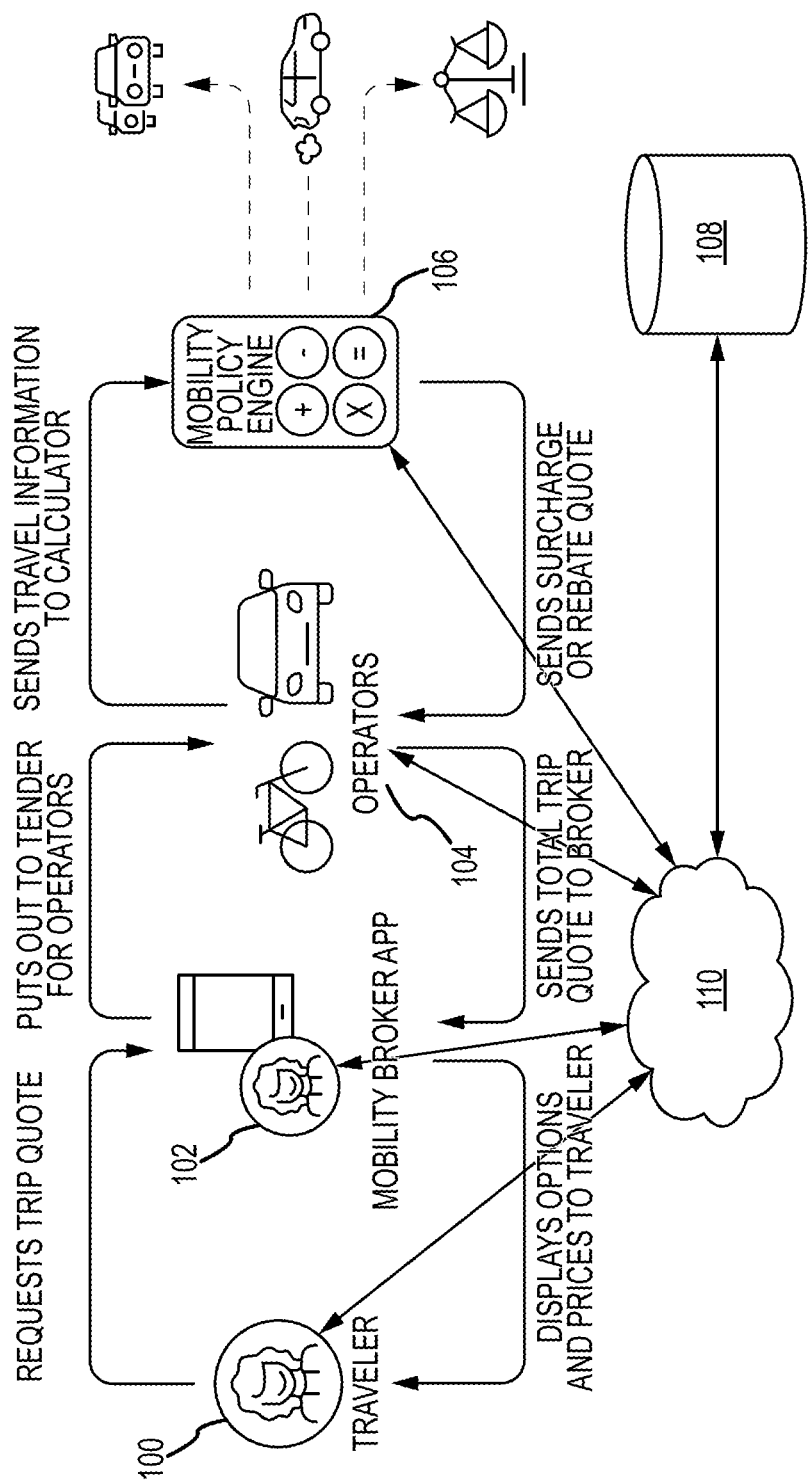
FIG. 1 is a diagram showing components providing commercial transport and a mobility policy engine according to embodiments.

Embodiments of the invention(s) described herein are generally related to a dynamic tax and subsidy engine that can be utilized to implement a mobility policy by generating a tax (or other cost) or subsidy (or other benefit of value) for the proposed use of transportation in real time. That said, a person of ordinary skill in the art will understand that alternative embodiments may vary from the embodiments discussed herein, and alternative applications may exist outside of transportation/mobility. For example, to achieve healthcare policy objectives, a government may use features of the present invention to dynamically raise and lower taxes on items, such as sugar, to achieve overall goals of reducing obesity and improving healthcare. Similar implementations may be applied to generate dynamic subsidies for fitness centers to achieve similar objectives and encourage discount fitness centers in low income area. To enhance environmental policy objectives, a government may use the dynamic tax/subsidy infrastructure described herein to create sophisticated pricing or carbon and other pollutants using revenue generated to subsidize different means of production to help decarbonize the economy. It will be appreciated that the examples described above are merely representative in nature and that numerous applications exist for the systems and methods disclosed herein.

Embodiments described herein provide a tool to enable a government (or other authority) to achieve policy objectives (such as, but not limited to, reducing congestion, reducing pollution/emissions, improving air quality, encouraging social distancing, improving equity, improving access, minimizing crowd density (oftentimes due to large public events), etc. by impacting the price of different mobility options at the point of consumption in real-time using both dynamic (e.g., reactive to real-time or recent data) and rules-based pricing formulas (which may be independent of recent data). In particular, embodiments provide for a dynamic and/or rules-based pricing allocation engine that enables regional planning or other city authorities to influence policy outcomes through real-time data driven pricing signals for transit, rideshare and road usage. The taxes and/or subsidies may be based on price elasticity of demand to enable achievement of specific defined policy objectives, such as by effecting a change of a certain amount for a particular policy objective (e.g., reducing carbon emissions from private hire vehicles by 15%). To achieve various policy objectives, the government (or other entity) may implement any combination of taxes and/or subsidies. For example, the government may generate a tax to increase the cost of single occupancy rideshare in response to heavy congestion and to offer subsidies, rebates, and/or other discounts to reduce the cost of pooled rideshare at the same time. By increasing the price different between pooled and single occupancy rideshare drives modal shift, allowing the government to achieve its objective of reducing congestion. Similar arrangements may be applied to taxes and/or subsidies to achieve policy goals related to carbon emissions, equity, air quality, and/or any number of other policy objectives.

In some embodiments, a government (or other authority) may choose to implement a total journey fare capping program, which limits a maximize cost to a traveler for using specific modes of transportation. Typically, such a program involves an entity (such as the government) offering subsidies to travelers who utilize certain combinations of travel, certain routes, etc. For example, an entity may determine that a trip from a specific point A to a specific point B (or a trip of a certain distance and/or within a certain region) should cost no more than $X. This fare cap may be for a specific mode or combination of modes of transport (such as a shared ride vehicle from point A to a light rail at an intermediate location that transports the travel to point B). In some embodiments, such fare-capping may be provided by a private entity, with that entity subsidizing certain travel. As just one example, a private sector body, such as (but not limited to) a real estate developer or events arena, may arrange to subsidize all travel to and from a location by creating a fare cap that is applicable for all trips to and from a specific locale (possibly during a predetermined period of time). Such a fare cap may be designed to achieve a modal shift from single occupancy to pooled rides (or mass transit options) to achieve a carbon emissions reduction and/or a reduction in traffic congestion.

In some embodiments, a concession program for multi-modal trips may be implemented. For example, an entity may choose to offer concession discounts to particular travelers (children, seniors, handicapped, certain employees, new customers, students, etc.) for discounts (indefinite or for a predetermined period of time, such as for one month) on one or more specific modes of travel, which may be done to encourage such users to take advantage of a particular form of transportations, such as mass transit options, bicycles, etc., to achieve policy goals. As just one example, an entity (government or other), such as the department of education for a particular jurisdiction, may request and fund student concession pricing for transit ridership being applied to bicycle trips using private bicycle operators. This encourages the students to utilized the bicycles, which may alleviate traffic congestion and parking issues at schools, while also helping to reduce carbon emissions and improving air quality. In some embodiments, the concessions may be applied on travel whether the ticket (or other fare) was purchased, such as through public and private operators.

In some embodiments, concession discounts may be applied outside of a transit application. As another example, a ministry of health may offer a citizen concessions discounts to buy vegetables at a store to encourage healthy eating. For example, certain citizens may have a concession associated with an account ID. The citizen may present their account ID to a store, enabling the store to verify that the individual is eligible for a specific groceries concession and offer the citizen a discounted price. In another example, a private firm may officer a person a concessionary discount on non-mobility goods, such as movie tickets, to reward the person for being members of a certain reward scheme (such as signing up for a specific credit card) or as a marketing tool to drive more long term revenue by giving people concessionary prices which only apply ten times. The person's unique ID may enable the benefit to be strictly rationed and monitored to ensure no one may receive more than the rationed discounts.

FIG. 1 is a diagram showing components providing commercial transport and the mobility policy engine described herein. The various illustrated components (e.g., traveler 100, mobility broker 102, operators 104, mobility policy engine 106, external data sources 108) may comprise one or more computing devices, which may be operated or otherwise to manage by the entity illustrated. As just one example, the "traveler" 100 may be representative of the traveler's personal mobile device. Arrows between illustrated components are representative of data communicated between the components, which may be communicated in any of a variety of ways (e.g., wireless and/or wired communication, which may utilize one or more data communication networks, including the Internet). A person of ordinary skill in the art will recognize that alternative embodiments may include alternative configurations and/or components, and may vary from the components as illustrated in additional or alternative ways.

In commercial transport, a traveler 100 may request a quote for a trip to a mobility broker (consumer facing mobile application/website, etc.). Here, the mobility broker 102 may provide a platform or other interface that allows a traveler 100 to plan, request, and/or otherwise organize a trip between two or more locations. For example, in some embodiments the mobility broker 102 may be implemented on a website that may be accessed via the Internet and/or using an application (or "app") executed on the traveler's mobile device, a personal computer, a terminal, etc. A mobility broker 102 may be a booking agency for travel (e.g., UBER, LYFT, Metropolitan Transit Authority (MTA), etc.) and is an entity capable of operating as a broker between the traveler and multiple operators (private for-hire vehicles, taxis, buses, trains, shared-ride systems, rental vehicles, subways, bicycles, etc. As such, the mobility broker 102 can, in response to receiving the trip quote request from the traveler 100, put out to tender for various operators 104.

The operators 104 may comprise operators of any of a variety of types of transportation. This can include, for example, carpool and rideshare operators (e.g., single- and/or multiple-occupancy ridesharing), public transportation systems (e.g., light rail operators, bus operators, passenger train operators, etc.), bike and scooter sharing systems, etc. As a person of ordinary skill in the art will appreciate, often times the mobility broker 102 may also function as an operator 104, or even as multiple operators 104 (e.g. operating pooled and single occupancy operator services). Using the information regarding the requested trip (e.g., origin, destination, time of travel, etc.) each operator 104 can, using its own algorithm for trip price determination, determine a price for the requested trip and provide a quote to the broker 102. The broker 102 can then provide options and prices to the traveler 100, who can then choose from among the options.

According to embodiments, the mobility policy engine 106 can be utilized to provide operators 104 real-time tax and/or subsidy information, allowing operators 104 to determine whether a surcharge (tax) or rebate (subsidy) will be attached to the trip requested by the traveler 100 and include that information in the quote provided to the mobility broker 102. In so doing, the mobility policy engine 106 can allow governments to implement transportation policies in real time, taxing or subsidizing certain trips/behaviors, which can be responsive to real-time traffic and/or environmental factors. Moreover, because the mobility policy engine 106 communicates directly with operators 104, according to some embodiments, there is no need for the mobility policy engine 106 to communicate directly with the mobility broker 102.

That said, some operators 104 may not need real-time tax or subsidy information to offer a bid for a proposed trip, but instead may request this information once trip is completed.

For example, some operators 104 (e.g., scooter sharing systems) may be incapable of providing pre-ride bids, but may need to determine tax/subsidy information for completed rides (reconciling that information, for example, for all completed rides at the end of the day). In such instances, the mobility policy engine 106 can provide tax and/or subsidy information for the completed rides to the operators 104, on an as-needed basis.

As previously noted, the mobility policy engine 106 may be executed by one or more computing devices (e.g., a personal computer, server, etc.), accessible by a government agency or other entity operating the mobility policy engine 106. This can include computing devices local to the government agency and/or remote (e.g., executed in "the cloud"). In the latter case, these computing devices may be accessible via the Internet and/or another data communication network.

To obtain a tax and/or subsidy calculation from the mobility policy engine 106 for a ride (proposed or taken), operators 104 can provide information regarding the ride. This information can include, for example, a Vehicle Identification Number (VIN) of the vehicle providing the transportation, a time of departure, an origin, a destination, a mode of travel, a number of travelers, a name/identifier of operator, route information, and the like. Using that information, the mobility policy engine 106 then generates a tax (debt owed by transport operator to the government) or subsidy (debt owed by the government to a transport operator) quote for mobility operators on behalf of the government. Oftentimes this cost or benefit may be passed on to the traveler 100.

According to some embodiments, the mobility policy engine 106 may comprise one or more configurable modules that enable it to raise taxes or offer subsidies based on different policy priorities including congestion, emissions, air quality, equity, access, and so forth. The government (or other entity overseeing the mobility policy engine 106) can choose to use rules-based modules which will apply fixed rules, such as a charge per gallon of gas used in a trip. In some embodiments, fixed rules may be alternated periodically, such as monthly, daily, hourly, etc. Governments can also choose to configure dynamic pricing modules which generate a tax or subsidy quote based on at-the-moment considerations, including real time air quality data, real-time congestion data, real time information on traffic accidents, crowding, and so forth. The value of the tax or subsidy can then be calculated in real-time in accordance with the one or more modules enabled, according to their configuration. Once calculated, a tax or subsidy quote can then be sent directly to the transport operator 104. The operator 104 can chose to include this in the total price they quote to brokers 102 and on to travelers 100. Moreover, once a trip has occurred, an entry is made by the mobility policy engine 106 in a general ledger noting the tax or subsidy owed.

Module configurations can vary, depending on desired functionality. For example, module configurations may be configured to calculate a tax or subsidy for any combination of one or more policy concerns, such as those described below. In some embodiments, taxes or subsidies may be calculated based on equity, which may involve the tax or subsidy being based on ease of public transit use and may be determined by fixed rules or dynamically using real-time passenger information (RTPI) data. In some embodiments, carbon emissions, such as pricing based on carbon emissions attributable to a trip on a given mode, may be utilized to generate a tax or subsidy. Air pollution targets may be factored into the calculation of taxes and subsidies. For example, dynamically based on levels of particulate (such as a concentration of PM2.5 (particles that have diameter less than 2.5 micrometers)) in the air. In some embodiments, traffic congestion may be used in the tax/subsidy calculations. For example, in some embodiments, taxes or subsidies may be based on fixed rules for peak and off-peak hours. In other embodiments, tax or subsidy pricing may be dynamically calculated according to the levels of congestion reported by traffic intersections, mapping software, and RTPI data from the public transit system, connected vehicles, events charging based on rules saying an event will take place (e.g. a concert) and/or rules that kick in dynamically based on situations (e.g. in response to rain, location-based social media feeds). Prices may be changed to mitigate predicted congestion resulting from a decrease of walking, cycling, use of public transit, etc. In some embodiments, the tax or subsidy may be destination and/or origin based. For example, fixed rules may be implemented that subsidize or tax specific transport modes to and from a destination and/or origin such as an airport, train station or event venue.

In some embodiments, events may drive the tax or subsidy. For example, pricing rules may be created in anticipation of an event (such as, but not limited to, a concert or sports match) which will generate significant traffic volumes. Event information can come from a variety of sources, including police departments. In some embodiments, current weather conditions may be factored into the tax or subsidy calculation. For example, pricing may respond dynamically to weather events, such as changing pricing in the event of rain (which decreases the occurrence of walking and cycling modes). In some embodiments, traffic incidents may be factored into the tax or subsidy. For example pricing changes may be designed to respond dynamically to major traffic incidents such as highway closures or traffic accidents, which may help prevent unnecessary congestion at or near affected areas. In some embodiments, infrastructure management concerns may be taken into consideration when calculating a tax or subsidy. For example, pricing models may be designed to get vehicles to use different roads to more efficiently distribute vehicles throughout the system. In some embodiments, pricing may be based on zonal area income to further provide equity that accounts for discrepancies in income levels across a municipality or other community. In some embodiments, zonal pricing may be utilized to provide pricing for travel based on defined congestion zones within a city. In some embodiments, social distancing measures and targets may be utilized to calculate taxes or subsidies. For example, pricing models may be designed to reroute travelers away from crowded routes or stations. This may be done using live conditions and/or based on predictions of conditions at a traveler's estimated time of arrival at a particular location.

It will be appreciated that those policy objectives/factors described above are merely listed as examples and that any combination of any number of policy objectives/factors described herein or otherwise known may be used to generate taxes or subsidies depending on the needs of the government and/or other authority. Governments utilizing the mobility policy engine 106 can determine whether to use the modules, and how to configure them to implement a desired policy. For example, if the government desires to implement a policy based solely on carbon emissions and air pollution, the government can disable (or otherwise not implement) the other modules of the mobility policy engine 106. Because the mobility policy engine 106 may have a large variety of modules, the mobile policy engine provides for a high degree of customization for any given government, based on that government's policies.

Broadly speaking, the government can choose to use rules-based modules which will apply fixed rules, such as a charge per gallon of gas used in a trip. Governments can also choose to configure dynamic pricing modules which generate a tax or subsidy quote based on at-the-moment considerations, including real time air quality data, real-time congestion data, real time information on traffic accidents.

According to some embodiments, not only may the mobility policy engine 106 use information supplied by the transport operator (VIN, time of departure, etc.) to calculate tax and subsidy information for a ride, it may further base the calculation on information obtained from one or more external sources 108. One or more external sources 108 may be accessed or otherwise provide current (real-time or near real-time) and/or historical information such as, for example, weather information, air quality information, intersection data for traffic levels, roadway congestion data, public transit schedules, average fleet fuel efficiency, RTPI data for public transit system, event schedules (and/or other information such as expected crowd size, etc.), crowd/density information, construction information, and the like. In some embodiments, live crowding data may be provided, such as from a transit agency back office (as well as BLE and mobile location data (from user's mobile devices)) that may be used to identify specific hot spots, such as locations within stations and/or other buildings such as a ticket line. Such information may be particular useful when a policy objective is to encourage social distancing.

The system including the traveler 100, mobility broker 102, operators 104, mobility policy engine 106, and external data sources 108 may be communicatively coupled with one another over one or more networks 110. For example, each network 110 may include one or more cellular data network, such as 3G, 4G LTE, 5G, and/or future cellular networks, WLAN, WiMAX, and/or other wireless network technologies.

In one example, a rules-based calculation for emissions may be described generically as follows:

(one occupant price)

if mode of travel=single occupancy rideshare and number of travelers=1 and operator="[requesting operator]"

and time of departure="not peak"

and deadheading factor=1.5 then (calculated distance*deadheading factor)/average fleet efficiency of [requesting operator]*city carbon price per gallon Here, the "[requesting operator]" may be a particular operator 104, such as UBER and/or a particular type of service requested by a particular operator 104 (such as UBER X, UBERXL, UBERSELECT, UBERBLACK, UBERSUV, UBERPOOL, etc.). Deadheading factor may take into account the amount of time/distance the driver of the vehicle is operating the vehicle without any passengers (before/after transporting passenger, etc.).

This calculation can be performed by the mobility policy engine 106 (if an emissions module is activated), upon receiving a request for subsidy/tax information for a ride from an operator 104. Information not provided by the operator 104, such as the calculated distance, average fleet efficiency of the operator, and so forth, may be obtained via one or more external data sources 108, as noted above.

A mobility policy engine 106 receiving a request for subsidy/tax information from a particular operator 104 may perform the emissions calculated above if the emissions module for the mobility policy engine 106 is enabled. The mobility policy engine 106 can obtain the average fleet efficiency of the operator and the city carbon price per gallon from one or more databases or other external data sources 108. The mode of travel, number of travelers, and operator 104 (which may be in the form of an operator ID) may be provided by the operator 104. The calculated distance may be provided by the operator 104, or maybe obtained by the mobility policy engine 106 from another data source 108 (e.g., by using origin and destination information provided by the operator 104). As an example emissions calculations using the equation above, for a trip having a calculated distance of 10 miles, where the average fleet efficiency of the operator 104 (e.g., UBER) is 25 mpg, and the city imposes a carbon price of $1 per gallon, the resulting total price of the emissions calculation would be $0.60 for a single person traveling in a single occupancy rideshare vehicle.

In this example, the emissions module is configurable because the city (who may be overseeing or managing the mobility policy engine 106) is able to control the value of the "city carbon price per gallon" variable. The other variables are particular to the request. For example, the "calculated distance" is a function calculated from the origin and destination, and the "average fleet efficiency of [requesting operator]" variable is set to the average fleet fuel efficiency reported by the requesting operator to the city government, which can be on a periodic (e.g., monthly) basis.

It can also be noted that, in alternative embodiments, a rules-based calculation for emissions may utilize different information to determine the calculation. For example, as noted, the operator 104 may provide a VIN of the vehicle, in which case the mobility policy engine 106 may perform a lookup to determine the efficiency of the vehicle type (e.g., EPA-rated fuel economy). Alternatively, the operator 104 itself may be able to provide the mobility policy engine 106 with an efficiency of the vehicle, in which case that efficiency may be used in the calculation. Other calculations may similarly take into account-related data. For example, where route-based data is provided, a congestion pricing module may provide taxes or subsidies to routes to incentivize or discourage travel along the proposed route.

Modules may further be dynamic, adapting to particular traffic issues and/or other factors in real time. An example of this can be shown in a dynamic emissions pricing module, which can implement the following calculation, described generically:

(PM2.5 pollution call)

if pollution<=100 then 1 if pollution>100 and <200 then 1.5 if pollution>200 and <300 then 2 if pollution>300 then 3

(one occupant price)

if mode of travel=single occupancy rideshare and number of travelers=1 and operator="[requesting operator]"

and time of departure="not peak"

and estimated deadheading factor=1.5 then (calculated distance*deadheading factor)/average fleet efficiency of [requesting operator]*city carbon price per gallon dynamic one-person pollution charge=(PM2.5 pollution call)*(one occupant price)

Here, the "pollution" variable can be a real-time (or frequently updated) variable, allowing the mobility policy engine 106 to dynamically adjust emissions pricing to current pollution levels if the dynamic emissions pricing module is enabled.

As an example, the PM2.5 function can place a call out to the Weather Channel (or other external data source 108 for pollution levels) asking for the city-wide average pollution in PM2.5 parts per million. In the instance where the score returned is 175, this results in the PM2.5 function value at the time being 1.5. Similar to the previous example, for a full trip requested that is 10 miles, at a fuel efficiency of 25 mpg and a carbon price of $1 per gallon, the calculation would yield a total price of $0.60 for a single person traveling in a single occupancy rideshare vehicle. This can then be multiplied by the 1.5 value from the PM2.5 function resulting in a total charge of $0.90.

As another example, a dynamic module may be provided that performs dynamic crowd pricing, such as to encourage social distancing behavior. An example of this can be shown in a dynamic emissions pricing module, which can implement the following calculation, described generically:

(real-time crowding call)

if crowding origin<=100 then 1 if crowding origin>100 and <200 then 1.5 if crowding origin>200 and <300 then 2 if crowding origin>300 then 3 if crowding mode<=100 then 1 if crowding mode>100 and <200 then 1.5 if crowding mode>200 and <300 then 2 if crowding mode>300 then 3 if crowding destination<=100 then 1 if crowding destination>100 and <200 then 1.5 if crowding destination>200 and <300 then 2 if crowding destination>300 then 3 then crowd pricing=(crowding origin*crowding mode*crowding destination)*crowding tariff Here, the "crowding tariff" factor may be set by a managing authority to achieve a low crowding goal. As an example, the real-time crowding function can place a call out to the an external source 108 (such as a transit authority, crowding manager, and/or other entity that may collect data on the crowd density in a given location) asking for the crowd levels at the origin, destination, and/or on a given mode of transportation (e.g., bus, train, etc.). In the instance where the crowding origin level returned is 79 (indicating relatively low crowds), a crowding mode level of 110 (indicating moderate crowds on the selected mode of transportation), and a crowding designation level of 90 (indicating low crowds), the three scores associated with these levels are multiplied together, with the resulting product being multiplied by the crowding tariff set by a managing authority (here, $1). This results in a tax value of $1.50 in the present case.

In some embodiments, such as those in which the mode of transportation is a shared ride vehicle (such as an UBER), the crowd mode score may be removed and/or replaced with a factor that is fixed based on the mode of transportation, rather than being adjusted to real-time crowd conditions.

In some embodiments, multiple policy concerns may be combined to generate a tax or subsidy. As just one example, a government may decide to minimize both crowding and air pollution. Using similar variables as in the single policy cases, the combined pricing may be determined based on ((crowding origin*crowding mode*crowding destination) *crowding tariff)+(calculated distance*deadheading factor/ average fleet efficiency of [requesting operator]*city carbon price per gallon). In operation, the mobile policy engine 106 (possibly using a real time crowding function module) places a call out to a crowding manager or other external source 108 for current levels of crowding at the origin, for a given mode of transportation, and/or at the destination. Based on these scores, a crowding tax is calculated. For the same current conditions set forth above, the crowding tax is $1.50. For the dynamic air pollution calculation, the mobile policy engine 106 places a call out to an external data source 108 (such as a local or national weather service) requesting city-wide average pollution in pm2.5 parts per million (or other particle size/concentration levels). Based on this data and the data from the operator 104, the mobile policy engine 106 generates a total charge for the air pollution. Using the same current conditions set forth above, the air pollution tax is $0.90. The crowding tax and pollution tax may be added together to arrive at a total tariff to be charged of $2.40.

It will be appreciated by those of skill in the art that the examples above are representative of only a tiny subset of possible policy subsidy/tax calculations. Any combination of one or more policy concerns may be used to generate a subsidy or tax to achieve various policy goals. For example, different variables and inputs may be included (possible with different tiers/ranges of scores), different formulas may be used to generate a tax, etc. In some embodiments, a formula may be strictly based on static or dynamic data, while in other embodiments both static and dynamic (real-time) data may be combined to generate a tax or subsidy. Additionally, the various calculations above may be modified to suit the needs of a particular entity. For example, price breaks may be provided for multiple travelers on a single trip. Additionally, while shown generally with calculating taxes (money owed), it will be appreciated that similar calculations may be performed to calculate subsidies that further encourage certain behaviors. For example, subsidies (such as in the form of credits or other discounts) may be calculated for mass transit modes of transportation (such as buses or trains) and/or for low emission vehicles (such as hybrids, natural gas vehicles, hydrogen vehicles, electric vehicles, bicycles etc.), while taxes may be imposed on vehicles with lower occupancy (UBER, taxis, etc.) and/or vehicles with high emission rates. Subsidies may also be offered to people traveling on routes where no public transit option is offered as in lower density areas. Subsidies may also be targeted at people in lower income communities by offering incentives based on point of origin or destination.

In some embodiments, the mobility policy engine 106 can accommodate instances in which the mobility broker 102 provides travel options to the traveler that include multiple legs and multiple modes of transportation for the requested trip. For example, the mobility broker 102 can send information on all legs of the trip to be taken if multi modal. In some embodiments, the mobility broker 102 may submit each leg of the trip (and/or each different mode of transportation) individually to various operators 104, which may then check with the mobile policy engine 106 to determine whether a tax or subsidy is applicable to each leg (or mode of transport) of the trip. The mobility policy engine 106 may calculate any applicable tax and/or subsidy for each leg and report the tax or subsidy to each operator 104 of the trip. Each operator 104 may then report the relevant tax or subsidy to the mobility broker 102, which may optionally pass the tax or subsidy to the traveler 100, oftentimes as part of a quote for the trip or leg of the trip. Oftentimes, in a multi-modal trip, the mobility broker 102 may aggregate the various legs (and/or modes of transportation) and supply a single quote for the entire trip to the traveler 100, although in some embodiments, some or all of the legs may be broken out and presented separately to the traveler 100, enabling the traveler to view the cost of each leg, which may encourage and give the opportunity for the traveler 100 to alter the trip to utilize cheaper modes of transportation (which may further the government's policy objectives).

Over time, as the mobility policy engine 106 is used, additional data can be captured and analytics can be utilized to refine and optimize the use of subsidies and taxes via the mobility policy engine 106. That is, as the mobility policy engine 106 is used to calculate taxes and subsidies, subsequent data (e.g., indicative of congestion, pollution, etc.) can be taken and analyzed to determine the effectiveness of the taxes and/or subsidies. This analysis may be conducted, for example, via machine learning algorithms, and may be used to build an insights engine that can provide recommendations for governments to implement taxes and/or subsidies to effectively implement a policy in view of current conditions. The insights engine can, for example, collect data from a variety of data sources, compare the data to patterns viewed in the historical data, and provide a recommendation for implementing a tax and/or subsidy. For example, the engine may indicate that implementing a tax of $X is predicted to reduce PM2.5 by Y %, to help achieve a current or long-standing goal of improving air quality. The insight engine may provide these insights to a human for approval, or may ultimately apply the tax and/or subsidy automatically (e.g., by configuring the modules of the mobility policy engine 106 appropriately).

Once a trip has occurred, the mobility policy engine 106 may be able to create an entry in a general ledger noting the tax or subsidy owed. After trips are taken, operators 104 can verify information against the entries created by the mobility policy engine 106, and governments can review ledgers for all operators 104. This can provide an enforcement mechanism for governments to determine whether operators 104 are reporting subsidies and taxes accurately. Reconciliation may be performed on a regular (e.g. daily) basis, where entries in the general ledger are totaled up and provided to parties for reconciliation (e.g., operator X owes government a first amount in taxes, government owes operator Y a second amount in subsidies, and so forth).

Figure 2:
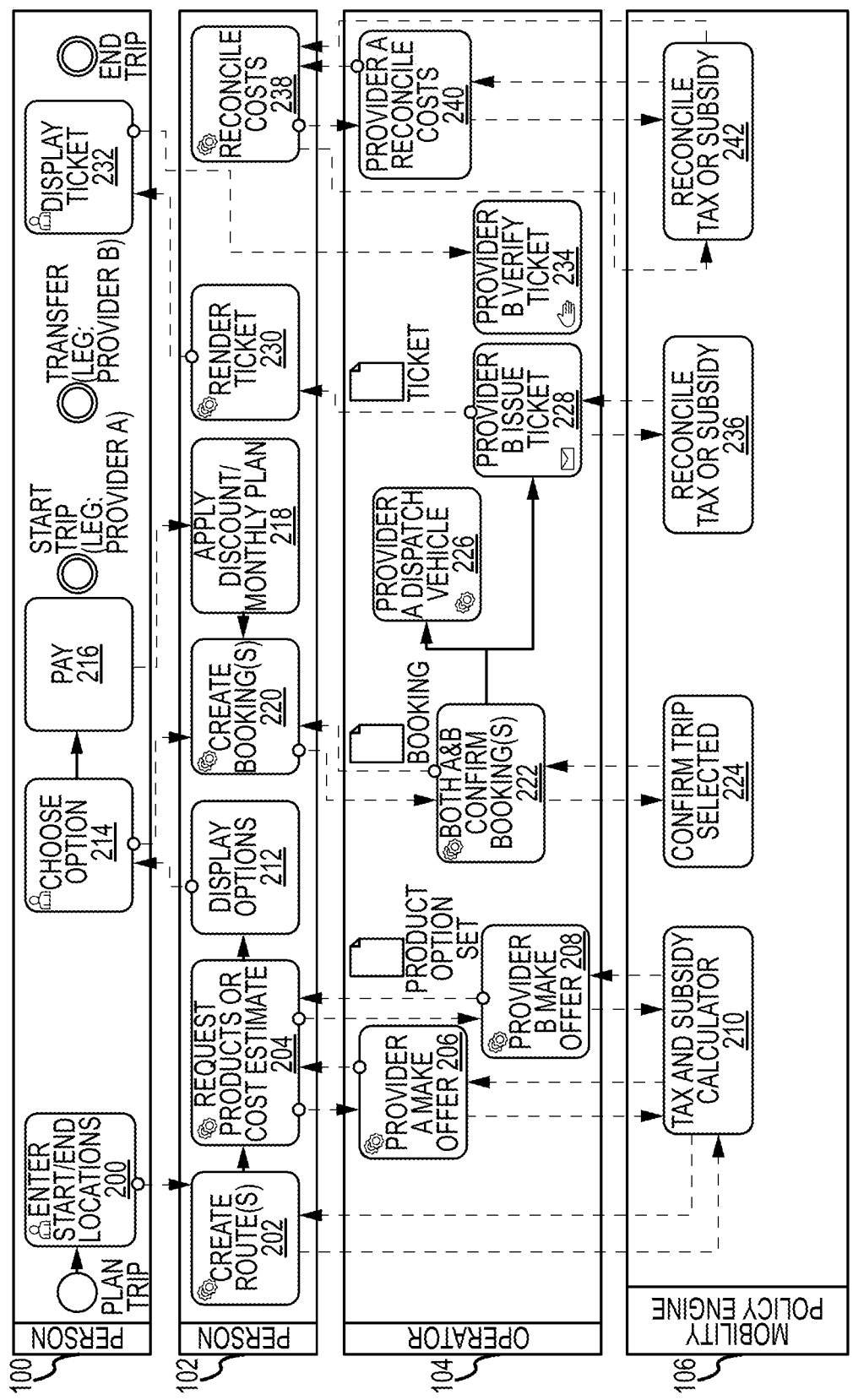
FIG. 2 is a diagram illustrating an example interaction between a traveler, mobility broker, operator, and mobility policy engine according to embodiments.

FIG. 2 is a diagram illustrating an example interaction between a traveler 100, mobility broker 102, operator 104, and mobility policy engine 106, according to one embodiment. Here, the diagram is intended to show an example interaction in more detail than the general process shown in FIG. 1.

The interaction between the various entities is as follows. The traveler 100 plans a trip by utilizing a web site, application, or other means to provide the mobility broker 102 with various trip details, such as starting and ending locations (origin and destination) at block 200. The mobility broker 102 then determines the route at block 202 and requests products or cost estimates from one or more various operators 104 based on the route at block 204. As a brief note: the interaction between the mobility broker 102 and mobility policy engine 106 illustrated in FIG. 2 shows an optional interaction in which the mobility broker 102 may obtain tax and/or subsidy information directly from the mobility policy engine 106 for multi-modal trips in which multiple operators 104 may be providing transportation for different legs of the trip. In such instances, in addition to providing taxes and/or subsidies to individual operators 104 (based on an individual operator's portion of the trip), a government may want to provide a tax or subsidy based on the overall trip. This can provide a government additional flexibility in providing taxes or subsidies for multi-model trips.

For multi-modal trips, the mobility broker 102 can put out to tender each leg of the trip, potentially receiving multiple quotes from multiple operators 104. In the illustrated example of FIG. 2, the broker splits the trip into two legs, and, among other operators (not shown) provider A provides the broker with a bid for a first leg of the journey at block 206, and provider B provides a bid for a second leg of the journey at block 208 (however any number of operators 104 may be involved in a particular request). As part of making these bids, providers A and B send information to the mobility policy engine to calculate tax and/or subsidy information at block 210 (which may be unique to each operator 104, as previously noted), which is returned to providers A and B and accounted for in the bids provided by providers A and B to the mobility broker 102. Mobility broker 102 then provides options (such as by displaying the options on a screen of the traveler's computing device) for travel to the traveler 100 requesting the trip based on bids from the operators 104 at block 212. The traveler 100 then chooses a desired option (selecting providers A and B in this case) at block 214, and pays for the chosen option (e.g., using the application, website, etc.) at block 216, which may include applying the trip or payment for the trip against an account or monthly plan at block 218 or by entering other payment information (such as a payment media identifier or other account identifier) into a mobile application or website of the mobility broker 102. The chosen option is provided back to the mobility broker 102, which creates the bookings with the providers A and B at block 220. Providers A and B confirm the bookings with both the mobility broker 102 and the mobility policy engine 106 at blocks 222 and 224. In the illustrated example, provider A (e.g., a ride share operator) dispatches a vehicle at block 226, while provider B (e.g., a bus or train operator) issues a ticket at block 228 (which may be provided to the person via the broker's application or website at block 230, for example) for subsequent display on the traveler's computing device at block 232. The traveler 100 may present the ticket to the operator 104 (Provider B) at an appropriate time, with Provider B verifying or otherwise validating the ticket at block 234. Finally, providers A and B (and optionally the mobility broker 102) may reconcile taxes or subsidies for respective portions of the trip using the mobile policy engine 106. For example, Provider B may reconcile any tax or subsidy associated with the second leg of the trip at the time of issuance of the ticket at block 236. Provider A and/or the mobility broker 102 may reconcile the costs/tax/subsidy at any point after the confirmation of the booking and/or after completion of one or more legs of the trip (or the entire trip) as shown in blocks 238, 240, and 242.

As previously noted, embodiments are not necessarily limited to those described explicitly herein, and may be implemented by non-government entities and/or applied in other (e.g., non-transportation) applications. For example, non-government entities that may utilize the mobility policy engine may include real estate developers and/or event venues, which could use the mobility policy engine to subsidize certain modes of transport. For instance, a real estate developer could subsidize all pool trips to and from their development and use that to achieve compliance with CEQA in California by demonstrating that it would take vehicles off the road and reduce VMT as more travelers used pool rather than single occupancy trips.

Figure 3:
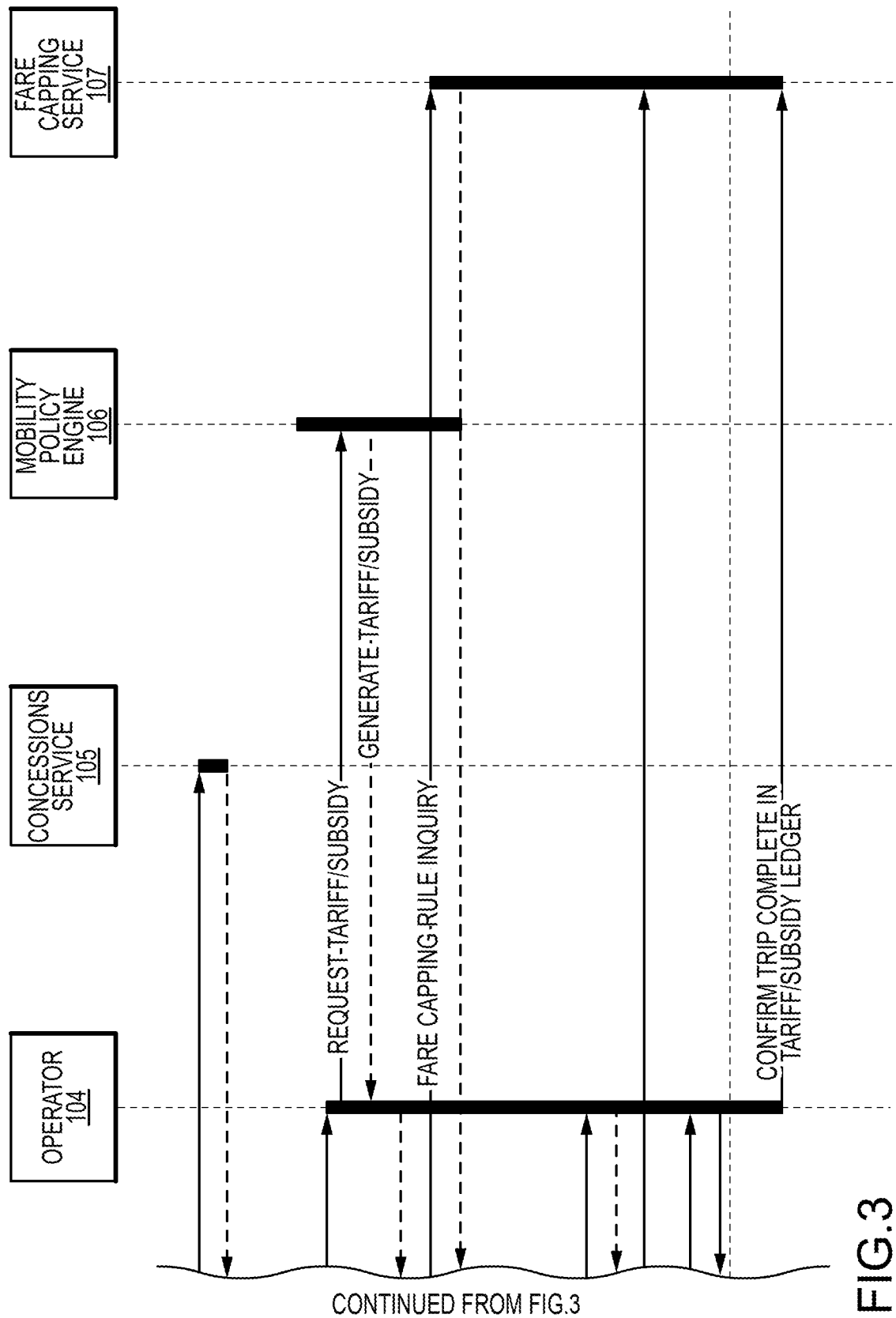
FIG. 3 is a swim lane diagram representing a process for providing taxes or subsidies associated with a trip according to embodiments.

FIG. 3 is a swim lane diagram representing one embodiment of a process for providing taxes or subsidies associated with a trip. FIG. 3 illustrates interactions between traveler 100, a mobile application (or website) 101 that may be a front-end interface associated with a mobility broker 102, a journey planning service 103, one or more operators 104, a concessions service 105, the mobility policy engine 106, and a fare capping service 107. The process begins by the traveler 100 interacting with an interface of the mobile application 101 to request a trip. The interaction may include the traveler 100 inputting information such as a trip origin, a trip destination, a time/date of travel, etc. into the mobile application 101. In some embodiments, the information may also include an account identifier of the traveler 100. This information may be passed from the mobile application 101 to the mobility broker 102. The mobility broker 102 may then take the trip-specific information to the journey planning service 103 (such as a mapping/routing service) that may use the origin, destination, and time/date of travel to map out a possible itinerary involving one or more modes of transportation and a schedule of one or more legs of the trip. This itinerary may be communicated back to the mobility broker 102. Once the itinerary is received, the mobility broker 102 may submit the account ID to the concessions service 105 to determine whether the traveler 100 is entitled to any concessions for one or more legs of the trip.

The concessions service 105 may lookup whether the account ID is eligible for any discount or other concessions. For example, the account ID may be eligible for a discount for disabled persons, students, children, seniors, etc. The concessions service 105 may then communicate to the mobility broker 102 whether any concessions are available, and if so, which concessions are available. In some embodiments, the concessions service 105 may maintain any number of tables or databases that associate account IDs from a number of travelers 100 with various concessions (and details thereof, such as terms, discounts, modes of transportation that each concession apply to, etc.). For example, each concession may be stored in a separate table/database, concessions offered by a common entity and/or with a similar discount may be stored on shared tables/databases, and/or all concessions may be stored in a single table/database. The tables and/or other databases may link the concessions with account IDs that are eligible for each respective concession. This allows the concessions service 102 to quickly determine whether a traveler 100 is eligible for one or more travel concessions for any of the legs of the trip.

Once the mobility broker 102 receives any concessions for the trip, the mobility broker 102 sends an itinerary to the mobile application 101 for display to the traveler 100. After viewing the itinerary, the traveler 100 may interact with the mobile application 101 to request a quote for the trip associated with the itinerary. The quote request may include origin, destination, and time/date information associated with each leg of the trip and/or of the trip as a whole. The mobile application 101 may pass the request to the mobility broker 102, which may then contact one or more operators 104 for each leg of the trip (or for the trip as a whole) to request quotes for each leg and/or the entire trip. In instances in which the traveler 100 qualifies for concessions for one or more legs of the trip, the concessions are passed to relevant operators 104 along with the quote requests. Once a quote request is received, each operator 104 may check with the mobility policy engine 106 to determine whether a tax or subsidy is associated with a leg of the trip (or the trip as a whole). The mobility policy engine 106 may take the origin, destination, time of travel, etc. information and calculate any applicable tax or subsidy associated with each leg or the trip as a whole based on current policy objectives. This calculation may be performed in a manner similar to that described above in relation to FIGS. 1 and 2 based on the origin, destination, time/date of travel, historical data, current conditions, current policy objectives, and/or other information.

Once any tax or subsidy has been calculated, the mobility policy engine 106 may send each tax or subsidy back to each respective operator 104, which may then combine the tax or subsidy with a cost for each leg to generate a quote for the respective leg and/or trip. This quote may be sent back to the mobility broker 102. In response to receiving the quote, the mobility broker 102 may communicate with the fare capping service 107 to determine whether any fare caps apply to the current trip. For example, the mobility broker 102 may send the account ID, along with an inquiry request with the trip information, to the fare capping service 107. The fare capping service 107 may use the account ID and trip information to determine whether a fare cap applies. For example, a fare cap for a trip between point A and point B using two specific modes of transportation may limit the total cost to the traveler 100 at $15. Once any applicable fare caps are identified, the fare caps (or an indication that none apply) may be communicated to the mobility broker 102. In some embodiments, this may involve communicating an identifier associated with a particular fare cap back to the mobility broker 102. The mobility broker 102 may assemble the quotes for each leg, factoring in any applicable concessions or fare caps to generate a quote for the entire trip. This quote may be communicated back to the mobile application 101 for review and acceptance by the traveler 100. In some embodiments, the quote may include only the total price, while in other embodiments, the quote may be itemized to include costs associated with each leg and/or any concessions and/or fare caps that were applied. Such itemized receipts may encourage a traveler 100 to re-plan a trip to use more cost-effective travel means, which may help further the policy goals of the governing body.

The traveler 100 may interact with the mobile application 101 to accept and book the trip. This confirmation/acceptance may be communicated to the mobility broker 102, while booking the trip and entering the trip in a trip ledger, operational ledger, and/or commercial ledger to create a record of the booked trip. The mobility broker 102 may communicate reservations to each of the operators 104 involved in the trip, which may each respond by providing access tokens (tickets, fare access credentials, which may be in the form of NFC and/or BLE data packets and/or machine readable identifiers such as barcodes, QR codes, etc.) to the mobility broker 102. This access token may be provided to the traveler 100 via the mobile application 101. The mobility broker 102 may communicate the reservation to the mobility policy engine 106, where an entry of the reservation (including relevant subsidies, taxes, concessions, and/or fare caps may be recorded).

At the time of the trip (or each leg thereof), each access token may be presented by the traveler 100 to a relevant one of the operators 104, which may scan the token (using an NFC, BLE, and/or optical reader, etc.) to validate the access token to permit the traveler 100 access to a particular transit vehicle. Once the trip (or each leg) is complete, the relevant operator 104 may communicate a confirmation of completion to both the mobility broker 102 and to the mobility policy engine 106. Based on the receipt of the confirmation, the mobility broker 102 may communicate a final bill summary to the traveler 100 via the mobile application 101. In some embodiments, the mobility broker 102 and/or operators 104 may then reconcile any costs/taxes/subsidies after the completion of the trip.

In some single transportation mode embodiments, a mobility broker 102 and an operator 104 may be the same entity and may operate in conjunction with the mobility policy engine 106. In such instances, a traveler 100 may interface with a mobile application or website, such as mobile application 101, that is affiliated with the mobility broker/operator (such as LIBER). This allows the traveler 100 to interact with the mobile application to submit a trip request to the mobility broker/operator, which may then use an external or internal journey planning service to generate an itinerary. This itinerary may be communicated back to the traveler 100 via the mobile application. The traveler 100 may then request a quote. The mobility broker/operator may query the mobility policy engine 106 to determine if any taxes or subsidies are applicable and may then generate a quote for the requested trip and provide the quote to the traveler 100. If the traveler 100 books the trip, the mobility broker/operator may record the reservation and provide the confirmation of the reservation to the mobility policy engine 106 for recordation in a ledger. The mobility broker/operator may provide some sort of access token (or other means of accessing a vehicle of the mobility broker/operator) that the traveler 100 may use to complete his trip. Once the trip is complete, the mobility broker/operator may communicate a confirmation of completion to the mobility policy engine 106 and a final bill summary to the traveler 100 via the mobile application. In some embodiments, the broker/operator may then reconcile any costs/taxes/subsidies with the mobility policy engine 106 after the completion of the trip.

Figure 4:
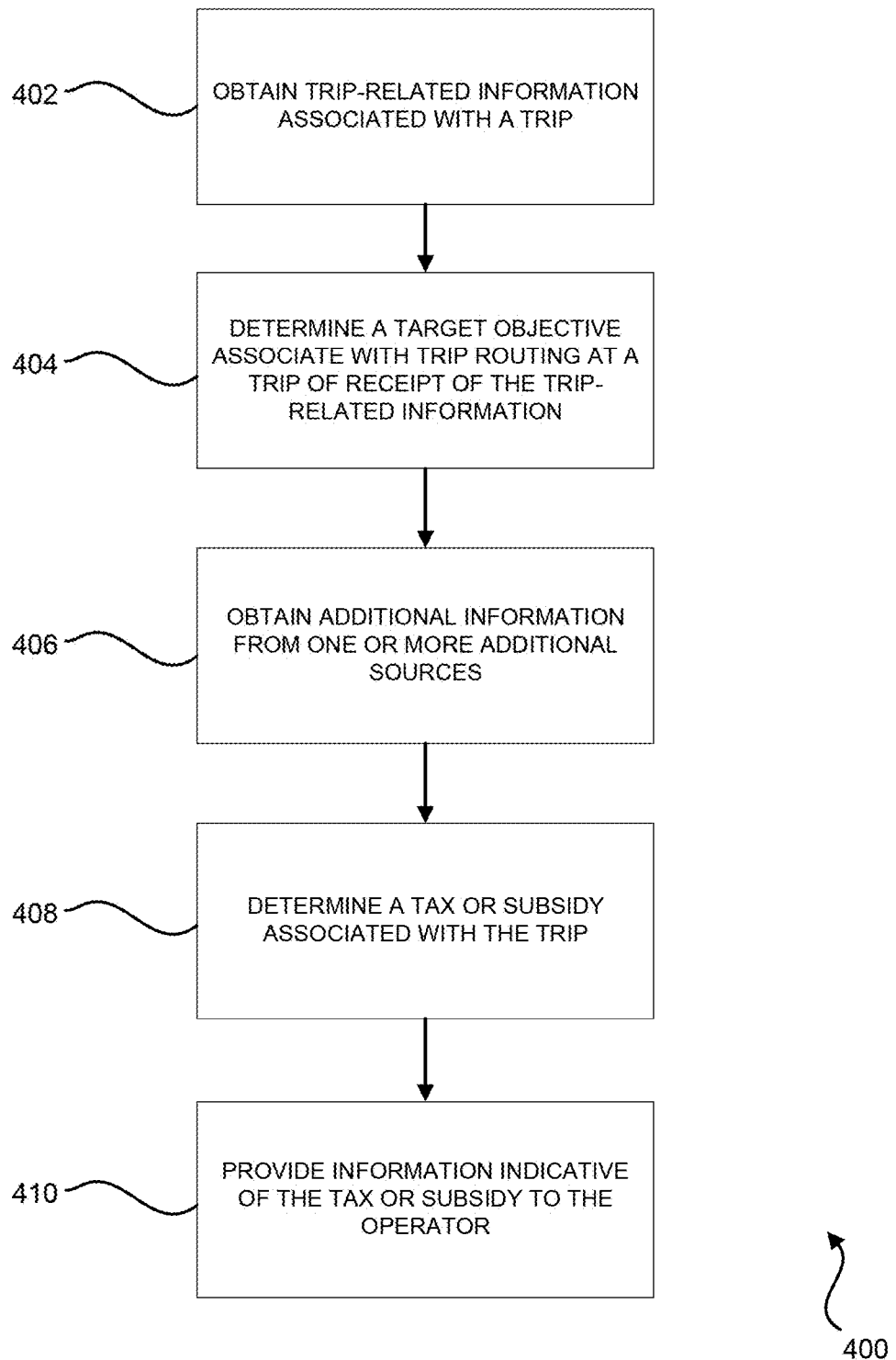
FIG. 4 is a flowchart illustrating a process of determining real-time tax and/or subsidy information according to embodiments.

FIG. 4 is a flowchart illustrating a process 400 of determining real-time tax and/or subsidy information. Process 400 may be performed by a mobility policy engine, such as mobility policy engine 106 described above. Process 400 may begin at block 402 by obtaining, from an operator, trip-related information regarding a trip. This information may include data such as an origin, a destination, a mode of transportation, a route, a time and/or date of the trip, an account ID associated with a traveler, etc. The mobility policy engine may determine one or more target objectives associated with trip routing at a time of receipt of the trip-related information at block 404. For example, an entity that operates or otherwise oversees the mobility policy engine (such as a government body) may decide to prioritize one or more policy objectives, such as reducing carbon emissions, reducing traffic congestion, improving air quality, reducing crowding, etc. In some embodiments, the policy objectives may be generic, such as merely to improve a particular metric, while in other embodiments, the policy objective may be to improve a particular metric by a certain amount or percentage, or to a predetermined level. For example, a target policy objective may be to reduce carbon emissions, reduce carbon emissions by 15%, and/or to reduce carbon emissions to a particular level.

Based on the target objective and the trip related information, the mobility policy engine may obtain additional information from one or more additional data sources at block 406. For example, if the target objective is related to carbon emissions, a request made be made to an external data source to provide current emissions data, while if the target objective is related to reducing traffic congestion, a request may be made to a data source to provide current traffic levels. The trip information (such as origin, destination, route, mode of transportation, and/or time/date, etc.) may be used to determine which location and/or time/date for which the additional information is to be retrieved. In some embodiments, the information may reflect real-time conditions in areas proximate the route of the trip. In other embodiments, such as those in which real-time data is not available (such as for trips in the future), historical data based on similar times and conditions (time of day, day of week, weather, event data, etc.) may be accessed.

Based on the trip-related information, additional information, and the target objective(s), the mobility policy engine may determine a tax or subsidy associated with the trip at block 408. This determination may be made using calculations similar to those described in relation to FIG. 1 above, although any formula or algorithm may be used to generate the fixed or dynamic tax or subsidy based on the policy objectives of a particular governing body. Once a tax or subsidy is determined, the mobility policy engine may provide information indicative of the tax or subsidy to the operator at block 410. In some embodiments, once the trip is completed, the mobility policy engine may receive a confirmation of completion of the trip from the operator. The mobility policy engine may then automatically document a ledger entry for the tax or subsidy.

Figure 5:
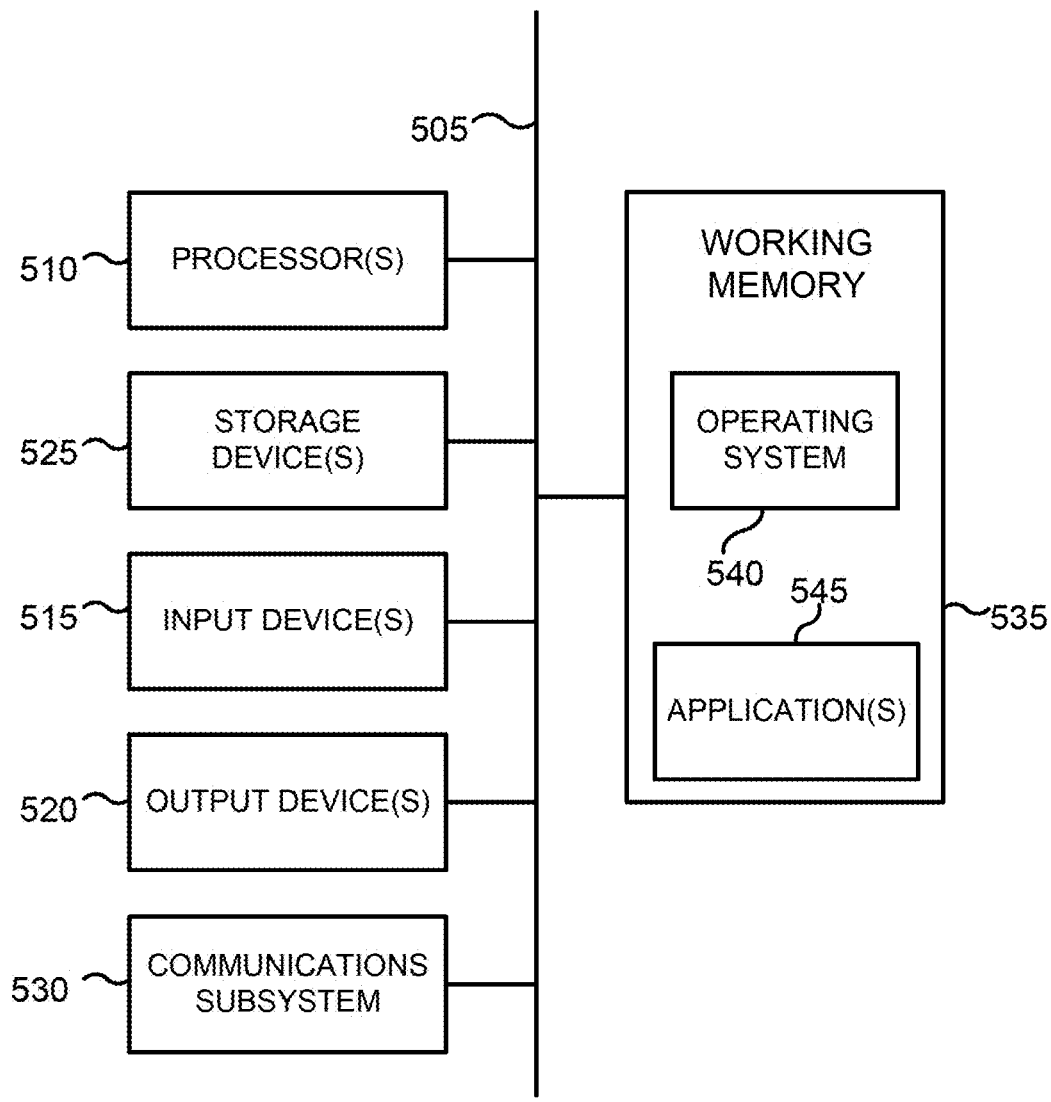
FIG. 5 is a simplified block diagram of a computer system according to embodiments.

FIG. 5 is a simplified block diagram of a computer system 500, according an embodiment. A computer system 500 as illustrated in FIG. 5 may, for example, may correspond with and/or be integrated into one or more components of the commercial transport or mobility policy engine illustrated in FIG. 1. FIG. 5 provides a schematic illustration of one embodiment of a computer system 500 that can perform some or all of the steps of the methods provided by various embodiments described herein. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505, or may otherwise be in communication, as appropriate. The hardware elements may include one or more processors 510, including without limitation one or more general-purpose processors (e.g., CPUs) and/or one or more special-purpose processors such as digital signal processing chips, graphics acceleration processors (e.g., GPUs), and/or the like; one or more input devices 515, which can include without limitation a mouse, a keyboard, a camera, a touchscreen, and/or the like; and one or more output devices 520, which can include without limitation a display device and/or the like.

The computer system 500 may further include and/or be in communication with one or more non-transitory storage devices 525, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device, and/or a chipset, and/or the like. The communication interface 530 may include one or more input and/or output communication interfaces to permit data to be exchanged with other computer systems and/or any other devices described herein.

The computer system 500 also can include software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, all or part of one or more procedures described with respect to the methods discussed above, and/or methods described in the claims, might be implemented as code and/or instructions executable by a computer and/or a processor within a computer. In an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 525 described above. In some cases, the storage medium might be incorporated within a computer system, such as computer system 500. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the procedures of such methods are performed by the computer system 500 in response to processor(s) 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communication interface 530 and/or components thereof generally will receive signals, and the bus 505 then might carry the signals and/or the data, instructions, etc. carried by the signals to the working memory 535, from which the processor(s) 510 retrieves and executes the instructions. The instructions received by the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of determining real-time tax and/or subsidy information, the method comprising:
   obtaining, via a communications interface of a mobility policy engine computing device and from an operator computing device, trip-related information regarding a trip;
   determining, by the mobility policy engine computing device, a target policy objective associated with trip routing at a time of receipt of the trip-related information;
   obtaining, via the communications interface of the mobility policy engine computing device, additional information from one or more additional data sources based on the target policy objective and the trip-related information, the additional information comprising one or both of historical data conditions and real-time conditions associated with the target policy objective along a route of travel associated with the trip-related information;
   determining, by the mobility policy engine computing device and based on the trip-related information and the additional information, a tax or subsidy associated with the trip; and
   providing, via the communications interface of the mobility policy engine computing device, information indicative of the tax or subsidy to the operator computing device to incentivize or discourage travel along a particular route to achieve the target policy objective.

2. The method of claim 1, wherein:
   the trip-related information comprises:
      a Vehicle Identification Number (VIN),
      a time of departure for the trip,
      an origin of the trip,
      a destination of the trip,
      a mode of travel,
      a number of travelers,
      an identity of the operator, or
      route information of the trip, or
      any combination thereof.

3. The method of claim 1, wherein:
   the target objective comprises a first target objective and a second target objective; and
   the additional information is determined based at least in part on both the first target objective and the second target objective.

4. The method of claim 3, wherein:
   the tax or subsidy associated with the trip is based at least in part on a combination of the first target objective and the second target objective.

5. The method of claim 1, wherein:
   the additional information comprises real-time information, and the tax or subsidy is determined based, at least in part, on the real-time information.

6. The method of claim 1, wherein:
   the target objective comprises a metric associated with:
      equity,
      carbon emissions,
      air pollution,
      congestion,
      destination/origin,
      events,
      weather,
      traffic incidents,
      infrastructure management,
      zonal pricing, or
      any combination thereof.

7. The method of claim 1, further comprising:
   receiving a confirmation of completion of the trip; and
   automatically documenting a ledger entry for the tax or subsidy in response to receiving the confirmation.

8. A mobility policy engine computing device, comprising:
   a communications interface communicatively coupled with at least one network;
   a processor; and
   a memory having instructions stored thereon that, when executed, cause the processor to:
      obtain, via the at least one network and the communications interface from an operator computing device, trip-related information regarding a trip;
      determine a target policy objective associated with trip routing at a time of receipt of the trip-related information;
      obtain additional information from one or more additional data sources based on the target policy objective and the trip-related information, the additional information comprising one or both of historical data conditions and real-time conditions associated with the target policy objective along a route of travel associated with the trip-related information;

determine, based on the trip-related information and the additional information, a tax or subsidy associated with the trip; and provide via the at least one network and the communications interface, information indicative of the tax or subsidy to the operator computing device to incentivize or discourage travel along a particular route to achieve the target policy objective.

9. The mobility policy engine computing device of claim 8, wherein:
the additional information comprises average fleet fuel efficiency of a mode of travel associated with the trip.

10. The mobility policy engine computing device of claim 8, wherein:
the trip-related information comprises:
a Vehicle Identification Number (VIN),
a time of departure for the trip,
an origin of the trip,
a destination of the trip,
a mode of travel,
a number of travelers,
an identity of the operator, or
route information of the trip, or
any combination thereof.

11. The mobility policy engine computing device of claim 8, wherein:
the target objective comprises a first target objective and a second target objective; and
the additional information is determined based at least in part on both the first target objective and the second target objective.

12. The mobility policy engine computing device of claim 11, wherein:
the tax or subsidy associated with the trip is based at least in part on a combination of the first target objective and the second target objective.

13. The mobility policy engine computing device of claim 8, wherein:
the additional information comprises real-time information, and the tax or subsidy is determined based, at least in part, on the real-time information.

14. The mobility policy engine computing device of claim 8, wherein the instructions further cause the processor to:
receive a confirmation of completion of the trip; and
automatically document a ledger entry for the tax or subsidy in response to receiving the confirmation.

15. A non-transitory computer-readable medium having instructions embedded thereon which, when executed by one or more processors of a mobility policy engine computing device, cause the mobility policy engine computing device to:

obtain, via a communications interface of the mobility policy engine computing device and from an operator computing device, trip-related information regarding a trip;

determine a target policy objective associated with trip routing at a time of receipt of the trip-related information;

obtain, via the communications interface of the mobility policy engine computing device, additional information from one or more additional data sources based on the target policy objective and the trip-related information, the additional information comprising one or both of historical data conditions and real-time conditions associated with the target policy objective along a route of travel associated with the trip-related information;

determine, based on the trip-related information and the additional information, a tax or subsidy associated with the trip; and provide, via the communications interface of the mobility policy engine computing device, information indicative of the tax or subsidy to the operator to incentivize or discourage travel along a particular route to achieve the target policy objective.

16. The non-transitory computer-readable medium of claim 15, wherein the instructions further cause the mobility policy engine computing device to:
receive a confirmation of completion of the trip; and
automatically document a ledger entry for the tax or subsidy in response to receiving the confirmation.

17. The non-transitory computer-readable medium of claim 15, wherein:
the additional information comprises real-time information, and the tax or subsidy is determined based, at least in part, on the real-time information.

18. The non-transitory computer-readable medium of claim 15, wherein:
the target objective comprises a first target objective and a second target objective; and
the additional information is determined based at least in part on both the first target objective and the second target objective.

19. The non-transitory computer-readable medium of claim 15, wherein:
determining the tax or subsidy comprises calculating, with one or more modules, the tax or subsidy.

20. The non-transitory computer-readable medium of claim 19, wherein:
the one or more modules are user-configurable.

* * * * *